United States Patent [19]
Weiser

[11] Patent Number: 5,937,210
[45] Date of Patent: Aug. 10, 1999

[54] ONE-TIME-USE CAMERA WITH LENS DISFIGURING MECHANISM

[75] Inventor: Joseph C. Weiser, Rochester, N.Y.

[73] Assignee: Eastman Kodak Company, Rochester, N.Y.

[21] Appl. No.: 09/033,982

[22] Filed: Mar. 3, 1998

[51] Int. Cl.⁶ .................................................. G03B 17/24
[52] U.S. Cl. .................................................................. 396/6
[58] Field of Search ...................................................... 396/6

[56] References Cited

U.S. PATENT DOCUMENTS

| | | |
|---|---|---|
| 5,235,366 | 8/1993 | Kucmerowski . |
| 5,517,265 | 5/1996 | Zander et al. . |
| 5,563,669 | 10/1996 | Stephenson . |
| 5,614,976 | 3/1997 | Smart et al. . |
| 5,666,561 | 9/1997 | Stephenson . |

Primary Examiner—David M. Gray
Attorney, Agent, or Firm—Roger A. Fields

[57] ABSTRACT

A one-time-use camera comprising a taking lens for making successive exposures on a filmstrip, is characterized in that a lens disfiguring member is movable over the taking lens to scratch the taking lens after the last exposure has been made on the filmstrip, to prevent the taking lens from being reused.

6 Claims, 6 Drawing Sheets ated Oct. 8, 1996. The patent suggests that a resistive

ONE-TIME-USE CAMERA WITH LENS DISFIGURING MECHANISM

FIELD OF THE INVENTION

The invention relates generally to the field of photography, and in particular to one-time-use cameras. More specifically, the invention relates to a one-time-use camera with a lens disfiguring mechanism that disfigures the taking lens after the last exposure available on the filmstrip has been made. Damaging the taking lens prevents its reuse in a remanufactured camera, and mandates that a fresh lens be used in the remanufactured camera to preserve picture-taking quality.

BACKGROUND OF THE INVENTION

Film and cameras that are all in one, commonly referred to as single-use or one-time-use cameras, have become well known. Typically, the one-time-use camera is a simple point-and-shoot type comprising a plastic main body part which supports a conventional film cartridge in a cartridge receiving chamber, a film take-up spool in a film supply chamber, a fixed-focus taking lens, a film metering mechanism with a rotatably supported metering sprocket that engages the filmstrip, a manually rotatable thumbwheel rotatably engaged with a film spool inside the film cartridge, a single-blade shutter, a manually depressible shutter release button, a rotatable frame counter for indicating the number of exposures remaining to be made on the filmstrip, a direct see-through viewfinder, and in some models an electronic flash. A pair of plastic front and rear cover parts house the main body part between them to complete the camera unit. The rear cover part connects to the main body part and/or to the front cover part to make the main body part light-tight. A decorative cardboard outer box or label at least partially covers the camera unit and has respective openings for the taking lens, etc.

After each picture is taken with the one-time-use camera, the photographer manually rotates the thumbwheel in a film winding direction to similarly-rotate the film spool inside the film cartridge. This winds an exposed section of the filmstrip into the film cartridge. The rewinding movement of the filmstrip the equivalent of slightly more than one frame width rotates the metering sprocket in engagement with the filmstrip to decrement the frame counter to its next lower-numbered setting and to pivot a metering lever into engagement with the thumbwheel in order to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip have been made, and the filmstrip is completely wound off the take-up spool and into the film cartridge, the one-time-use camera is given to a photofinisher who tears the outer box off the camera unit, separates the rear cover part from the main body part, and removes the film cartridge with the exposed filmstrip from the cartridge receiving chamber. Then, he removes the exposed filmstrip from the film cartridge to develop the negatives and make prints for the customer. At least some of the used camera parts may be recycled, i.e. reused, to remanufacture the camera.

Prior Art Problem

There is a problem in the recycling, i.e. reuse, of used camera parts in that the reused parts may become worn or damaged. Consequently, picture-taking quality is affected.

Thus, it has been suggested that, during disassembly of the one-time-use camera to retrieve the exposed film, any worn or damaged parts be purposely fractured to render them detectably different. This allows the worn or damaged parts to be readily identified in order to be discarded, and prevents them from being reused in a remanufactured camera.

A patented example of a solution to the problem is disclosed in commonly assigned U.S. Pat. No. 5,563,669 issued Oct. 8, 1996. The patent suggests that a resistive heating element be positioned in the one-time-use camera to apply sufficient heat to a plastic taking lens to melt or deform the taking lens when the frame counter is rotated to indicate that the last exposure available on the filmstrip has been made. Damaging the taking lens to prevent its reuse, mandates that a fresh lens be used in a remanufactured camera. Thus, there is no chance of a worn or damaged lens being reused, which would affect picture-taking quality.

SUMMARY OF THE INVENTION

A one-time-use camera comprising a taking lens for making successive exposures on a filmstrip, is characterized in that:

a lens disfiguring member is movable over the taking lens to scratch the taking lens after the last exposure has been made on the filmstrip, to prevent the taking lens from being reused.

DETAILED DESCRIPTION OF THE INVENTION

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Film Cassette

Figure 3:
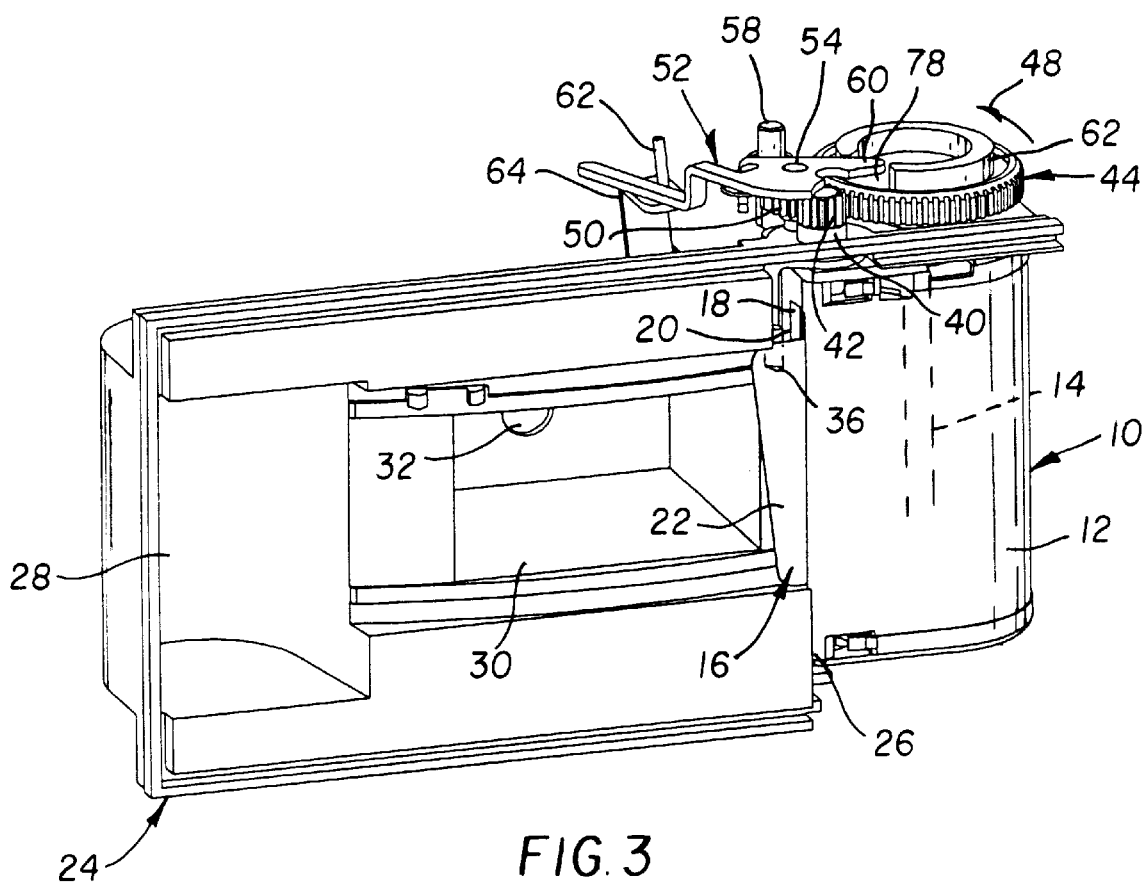
FIG. 3 is an assembled rear perspective view of the one-time-use camera showing its operation.

Referring now to the drawings, FIG. 3 shows a known film cassette 10 similar to the one disclosed in prior art U.S. Pat. No. 5,614,976 issued Mar. 25, 1997. The patent is incorporated into this disclosure. The film cassette 10 includes a cassette shell 12 that contains a rotatable spool 14 on which is to be wound an exposed filmstrip 16. A light lock 18 is supported within a film ingress slot 20 in the cassette shell 12 to be pivoted open to permit film movement into the shell and to be pivoted closed to prevent ambient light from entering the shell. FIG. 3 shows the film cassette 10 with the light lock 18 open, and only a trailing end portion 22 of the filmstrip 16 not wound into the cassette shell 12.

Camera

A partially shown one-time-use camera 24 which includes the film cassette 10 is shown in FIGS. 1–6. The camera 24 is similar to the one disclosed in the incorporated '976 patent and has a cassette receiving chamber 26 for the film cassette 10, a film roll chamber 28 for an unexposed roll (not shown) of the filmstrip 16, and a backframe opening 30 at which successive sections of the filmstrip are exposed before being wound into the cassette shell 12. A plastic taking lens 32 is supported opposite the backframe opening 30 for making each exposure on the filmstrip 16.

Figure 1:
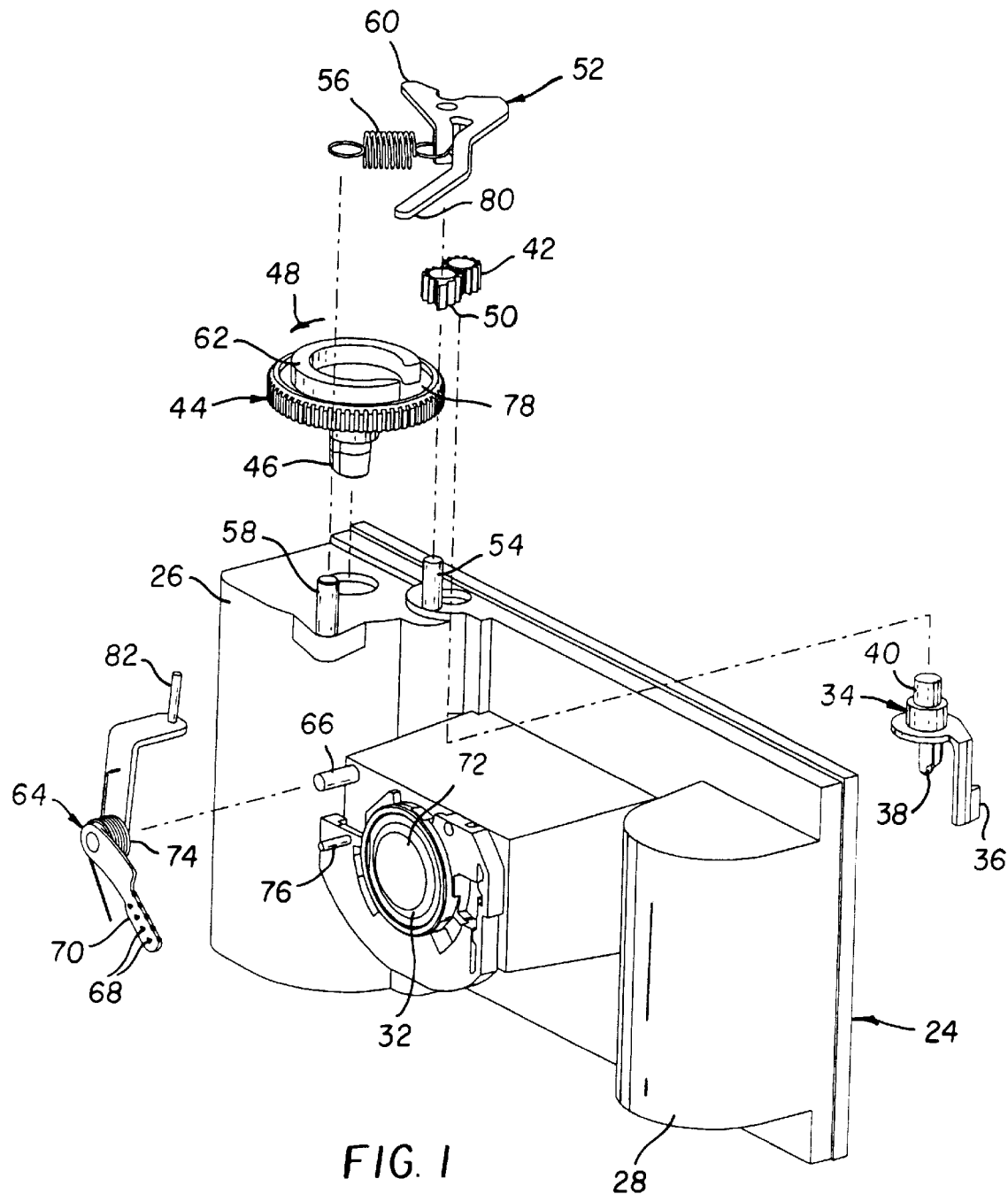
FIG. 1 is an exploded front perspective view of a one-time-use camera, according to a preferred embodiment of the invention.
Figure 2:
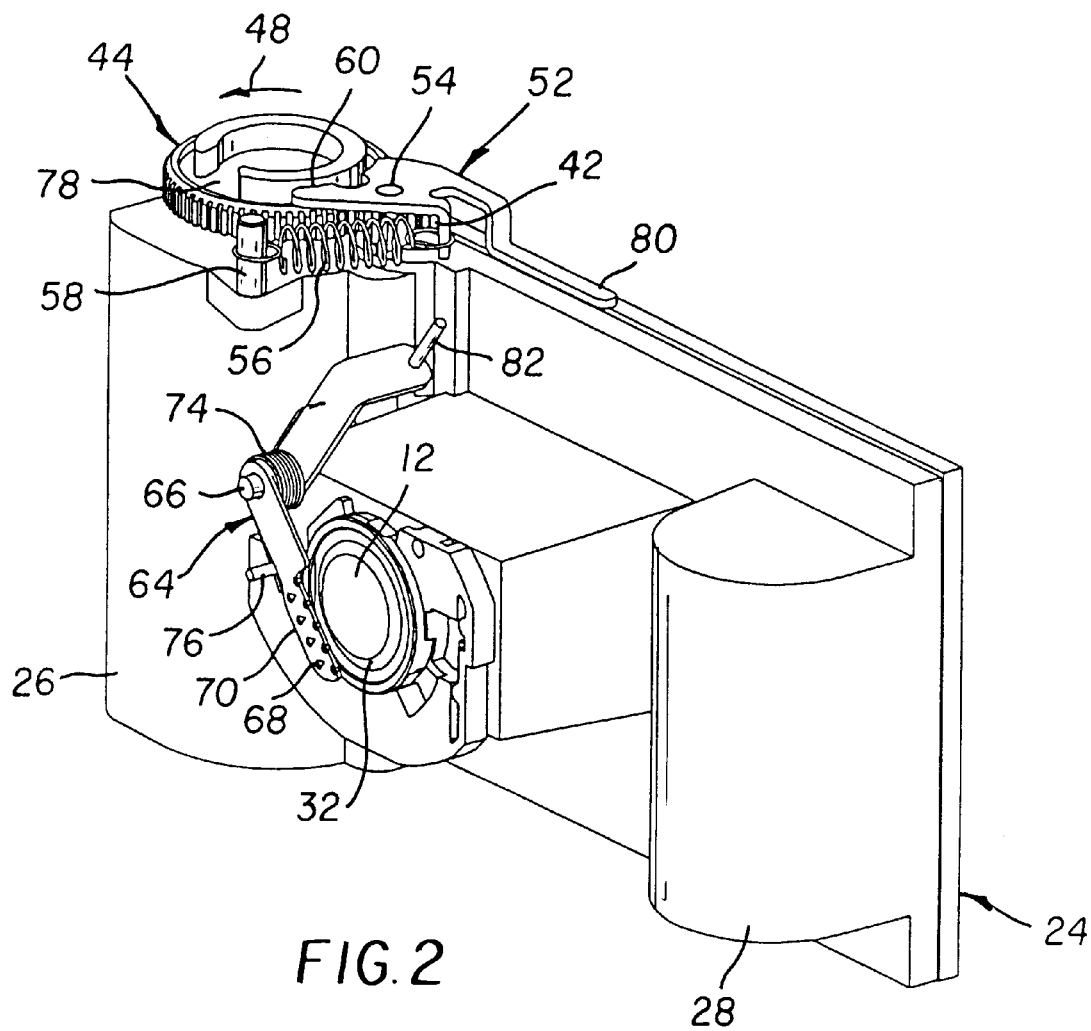
FIG. 2 is an assembled front perspective view of the one-time-use camera similar to FIG. 1.

As shown in FIGS. 1–3, a single-piece closing lever 34 is to be used for pivoting the light lock 18 closed after the trailing end portion 22 of the filmstrip 16 is wound into the cassette shell 12. The closing lever 34 comprises a film presence/absence sensor 36 in contact with successive sections of the filmstrip 16 immediately before each section is wound into the cassette shell 12, a drive-part 38 coaxially engaged with the light lock 18 to pivot the light lock closed, and a gear-support-part 40 on which is coaxially fixed a first spur gear 42. Rotation of the first spur gear 42 counter-clockwise in FIGS. 1 and 3 similarly rotates the drive-part 38 to pivot the light lock 18 closed.

A manual film rewind thumbwheel 44 has a depending drive-part 46 coaxially engaged with a protruding end of the spool 14 in the cassette shell 12. The thumbwheel 44 is manually rotated in a film winding direction 48 to similarly rotate the spool 14 to wind the filmstrip 16 including the trailing film end portion 22 into the cassette shell 12.

A second spur gear 50 continuously in mesh with the first spur gear 42 is coaxially fixed to an actuating lever 52. A fixed pin 54 supports the second spur gear 50 and the actuating lever 52 for simultaneous rotation about the fixed pin, and maintains the second spur gear continuously spaced from the thumbwheel 44.

A tension spring 56 has one end connected to a fixed pin 58 and another end connected to the actuating lever 52. The tension spring 56 biases the actuating lever 52 to rotate with the second spur gear 50 in a clockwise direction in FIG. 1 to, in turn, bias the first spur gear 42 to rotate in a counter-clockwise direction in FIG. 1 to urge the film presence/absence sensor 36 of the closing lever 34 against successive sections of the filmstrip 16 immediately before each section is wound into the cassette shell 12. Film resistance at the film presence/absence sensor 36 is greater than the bias of the tension spring 56. As a result, the spring 56 is prevented from urging the actuating lever 52 to rotate with the second spur gear 50 in a clockwise direction in FIG. 1 in order to move one end 60 of the actuating lever against an arcuate rib 62 on the thumbwheel 44. Instead, the lever end 60 is held spaced a slight distance from the arcuate rib 62.

A lens disfiguring lever 64 is pivotable about a fixed pin 66 and has several scratching or disfiguring protuberances 68 on the underside of a resilient arm 70 of the lever that will scratch or disfigure a concave face 72 of the taking lens 32 when the lever is pivoted. The resilience of the arm 70 causes the protuberances 68 to remain in contact with the concave face 72 when the arm is deformed and recovers its original shape as the arm is moved over the concave face. A return torsion spring 74 biases the lens disfiguring lever 64 clockwise in FIGS. 1 and 2 against a stop pin 76.

Operation

As shown in FIG. 2, when the thumbwheel 44 is rotated in the film winding direction 48 the trailing end portion 22 of the filmstrip 16 is drawn away from the film presence/absence sensor 36 of the closing lever 34 and into the slot 20 in the cassette shell 12. Once the trailing end portion 22 is moved clear of the film presence/absence sensor 36, the resulting absence of film resistance at the sensor allows the spring 56 to rotate the actuating lever 52 and the second spur gear 50 clockwise in FIG. 2 until the lever end 60 abuts the arcuate rib 62 on the thumbwheel 44. Consequently, the closing lever 34 is rotated counter-clockwise in FIG. 1 via the first spur gear 42 to make the drive-part 38 of the closing lever similarly pivot the light lock 18 initially closed about ten degrees, to partially (slightly) close the light lock.

Figure 4:
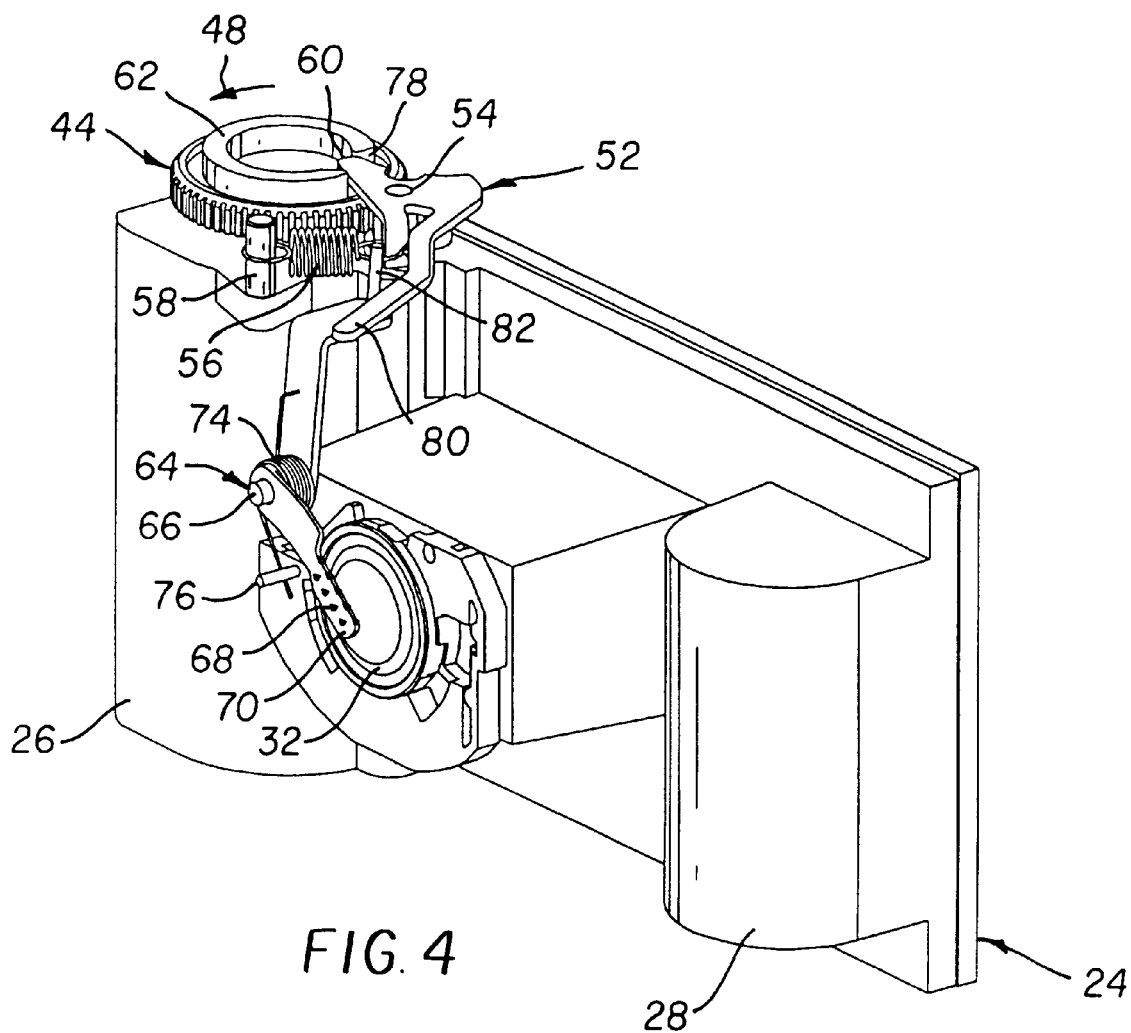
FIG. 4 is an assembled front perspective view of the one-time-use camera similar to FIG. 3.
Figure 5:
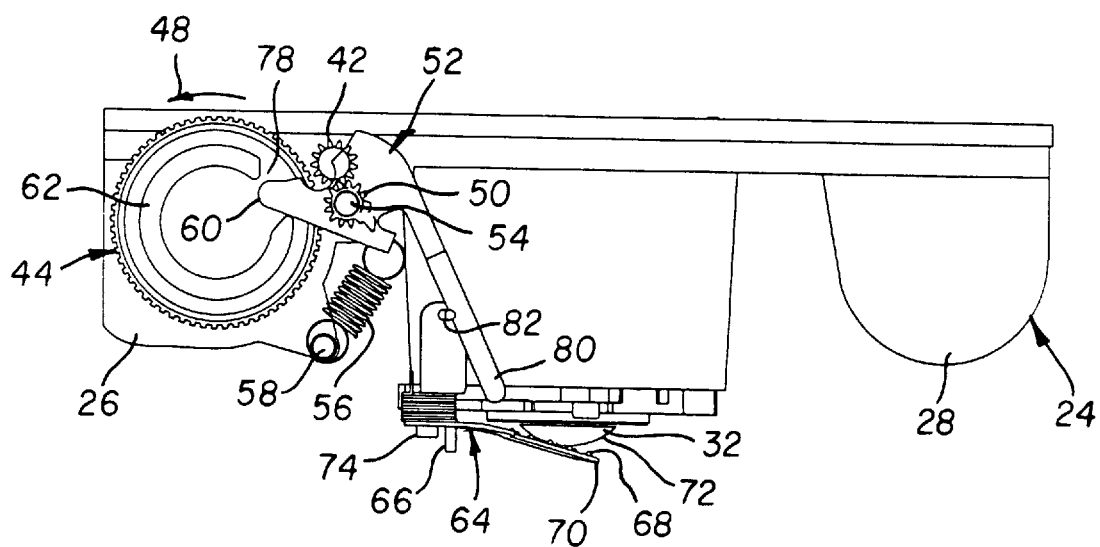
FIG. 5 is an assembled top plan view of the one-time-use camera similar to FIGS. 3 and 4.

In FIGS. 3–5, the thumbwheel 44 is rotated further in the film winding direction 48 than in FIG. 2 to draw the trailing end portion 22 of the filmstrip 16 away from the slot 20 and into the interior of the cassette shell 12 and to position a gap 78 in the arcuate rib 62 opposite the end 60 of the actuating lever 52. The presence of the gap 78 opposite the end 60 of the actuating lever 52 allows the spring 56 to rotate the actuating lever and the second spur gear 50 clockwise in FIGS. 3–5 until the end of the actuating lever is received in the gap. Consequently, the closing lever 34 is rotated counter-clockwise in FIGS. 3–5 via the first spur gear 42 to make the drive-part 38 of the closing lever similarly pivot the light lock 18 further closed about twenty degrees.

When the thumbwheel 74 is rotated further in the film winding direction 48 to draw the trailing end portion 22 of the filmstrip 16 further into the interior of the cassette shell 12 and to make the arcuate rib 62 move the end 60 of the actuating lever 52 to rotate the lever and the second spur gear 50 clockwise in FIG. 5. Consequently, the closing lever 34 is rotated counter-clockwise in FIG. 5 via the first spur gear 42 to make the drive-part 38 of the closing lever similarly pivot the light lock 18 further closed about thirty degrees.

Figure 6:
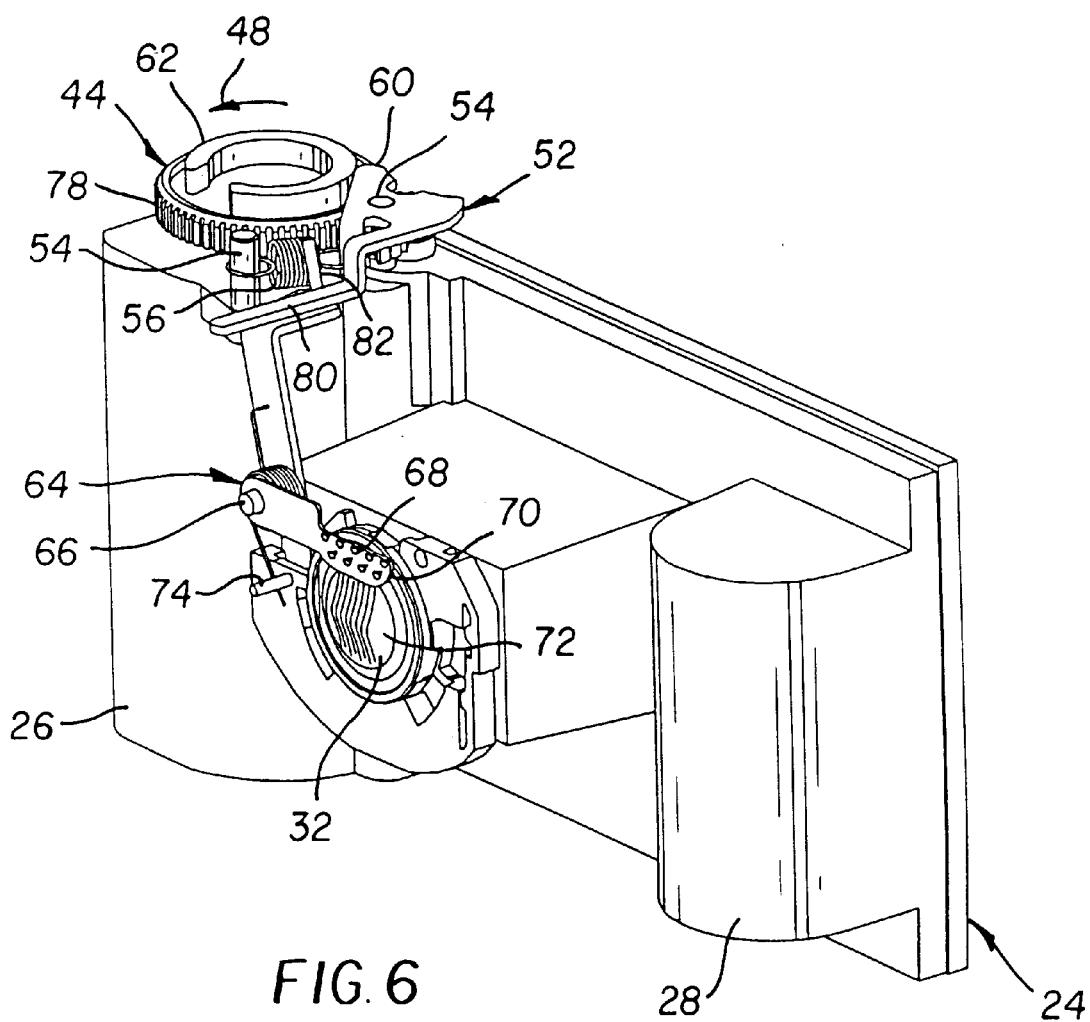
FIG. 6 is an assembled front perspective view of the one-time-use camera at a later stage of operation than in FIGS. 3–5.

In FIG. 6, the thumbwheel 44 is rotated further in the film winding direction 48 to draw the trailing end portion 22 of the filmstrip 16 further into the interior of the cassette shell 12 and to make the arcuate rib 62 move the end 60 of the actuating lever 52 to rotate the lever and the second spur gear 50 clockwise in FIG. 6 until the end is pushed out of the gap 78. Consequently, the closing lever 34 is rotated counter-clockwise in FIG. 6 via the first spur gear 42 to make the drive-part 38 of the closing lever similarly pivot the light lock 18 further closed about thirty-two degrees, to completely close the light lock.

When the actuating lever 52 is rotated clockwise in FIGS. 3–6, a leg 80 of that lever is swung against a projecting pin 82 on the lens disfiguring lever 64 to pivot that lever counter-clockwise in FIGS. 4 and 6 to cause the scratching or disfiguring protuberances 68 on the underside of the resilient arm 70 of the lever to scratch or disfigure the concave face 72 of the taking lens 32

The invention has been described with reference to a preferred embodiment. However, it will be appreciated that variations and modifications can be effected by a person of ordinary skill in the art without departing from the scope of the invention.

Parts List 10. film cassette
12. cassette shell
14. spool
16. filmstrip
18. light lock
20. slot 22. trailing end portion of filmstrip
24. one-time-use camera
26. cassette receiving chamber
28. film roll chamber
30. backframe opening
32. taking lens
34. closing lever
36. film presence/absence sensor
38. drive-part
40. gear-support-part
42. first spur gear
44. film rewind thumbwheel
46. drive-part
48. film winding direction
50. second spur gear
52. actuating lever
54. fixed pin
56. tension spring
58. fixed pin
60. lever end
62. arcuate rib
64. lens disfiguring lever
66. fixed pin
68. scratching or disfiguring protuberances
70. resilient arm
72. concave face
74. return torsion spring
76. stop pin
78. gap
80. lever leg
82. projecting pin

What is claimed is:

1. A one-time-use camera comprising a taking lens for making successive exposures on a filmstrip, is characterized in that:

a lens disfiguring member is movable over said taking lens to scratch the taking lens, to prevent the taking lens from being reused; and an actuating device for moving said lens disfiguring member over said taking lens to scratch the taking lens is actuated after a last exposure has been made on the filmstrip, to move said lens disfiguring member over said taking lens.

2. A one-time-use camera comprising a taking lens, a film cassette having a spool rotatable to wind an exposed filmstrip including a trailing film end portion into said cassette, and a film winder rotatable in engagement with said spool to rotate the spool to wind said exposed filmstrip including its trailing film end portion into said cassette, is characterized in that:

a lens disfiguring member is movable over said taking lens to disfigure the taking lens; and an actuating device for moving said lens disfiguring member over said taking lens is actuated when said film winder is rotated to wind said trailing film end portion into said cassette, to move said lens disfiguring member over said taking lens.

3. A one-time-use camera comprising a taking lens, a film cassette having a spool rotatable to wind an exposed filmstrip including a trailing film end portion into said cassette and a light lock movable to be closed after said trailing film end portion is wound into said cassette, a film winder rotatable in engagement with said spool to rotate the spool to wind said exposed filmstrip including its trailing film end portion into said cassette, and an actuating lever movable for closing said light lock responsive to rotation of said film winder to wind said trailing film end portion into said cassette, is characterized in that:

a lens disfiguring member is movable over said taking lens to disfigure the taking lens; and said actuating lever moves said lens disfiguring member over said taking lens to disfigure the taking lens when said actuating lever is moved for closing said light lock.

4. A one-time-use camera as recited in claim 3, wherein said taking lens has a convex face, and said lens disfiguring member is resilient to allow it to be deformed and recover its original shape when moved over said convex face.

5. A one-time-use camera as recited in claim 3, wherein said lens disfiguring member is constructed to scratch said taking lens.

6. A one-time-use camera as recited in claim 3, wherein said actuating lever has an extension movable to engage said lens disfiguring member to move the lens disfiguring member over said taking lens to disfigure the taking lens when the actuating lever is moved for closing said light lock, and a return spring resists movement of said lens disfiguring member over said taking lens to disfigure the taking lens.

* * * * *